United States Patent
Tiong

(10) Patent No.: US 11,283,586 B1
(45) Date of Patent: Mar. 22, 2022

(54) METHOD TO ESTIMATE AND COMPENSATE FOR CLOCK RATE DIFFERENCE IN ACOUSTIC SENSORS

(71) Applicant: Francis Tiong, Fremont, CA (US)

(72) Inventor: Francis Tiong, Fremont, CA (US)

( * ) Notice: Subject to any disclaimer, the term of this patent is extended or adjusted under 35 U.S.C. 154(b) by 0 days.

(21) Appl. No.: 17/013,577

(22) Filed: Sep. 5, 2020

(51) Int. Cl.
*H04L 7/00* (2006.01)
*H04R 3/00* (2006.01)

(52) U.S. Cl.
CPC ............ *H04L 7/0016* (2013.01); *H04R 3/00* (2013.01)

(58) Field of Classification Search
CPC ................................ H04L 7/0016; H04R 3/00
See application file for complete search history.

(56) References Cited

U.S. PATENT DOCUMENTS

| | | | |
|---|---|---|---|
| 4,864,253 A | 9/1989 | Zwack | |
| 5,245,667 A | 9/1993 | Lew | |
| 5,761,434 A | 6/1998 | Hewitt | |
| 5,793,739 A | 8/1998 | Tanaka | |
| 5,970,452 A | 10/1999 | Aktas | |
| 6,057,789 A | 5/2000 | Lin | |
| 6,347,380 B1 | 2/2002 | Chang | |
| 6,868,382 B2 | 3/2005 | Shozakai | |
| 7,392,102 B2 | 6/2008 | Sullivan | |
| 7,447,666 B2 | 11/2008 | Wang | |
| 7,680,154 B2 | 3/2010 | Stanton | |
| 8,144,819 B2 | 3/2012 | Baldemair | |
| 8,238,575 B2 | 8/2012 | Buck | |
| 8,407,163 B2 | 3/2013 | Andreoli | |
| 8,611,922 B2 | 12/2013 | Wigren | |
| 8,682,144 B1 | 3/2014 | Zhang | |
| 8,773,291 B2 | 7/2014 | Ruan | |
| 8,964,925 B1 * | 2/2015 | Saed | H03L 7/0807 375/373 |

(Continued)

FOREIGN PATENT DOCUMENTS

DE      0952713      10/1999

OTHER PUBLICATIONS

Geunhyeok Lee, Woongjin Park, Taewoong Kang, Kiman Kim and Wanjin Kim, "Chirp-Based FHSS Receiver With Recursive Symbol Synchronization for Underwater Acoustic Communication", MDPI Open Access Journal, www.mdpi.com, Dec. 19, 2018, Basel, Switzerland.

Hannes Gamper, "Clock Drift Estimation and Compensation for Asynchronous Impulse Response Measurements", Proc. Workshop on Hands-Free Speech Communication and Microphone Arrays (HSCMA), Mar. 2017, San Francisco, USA.

(Continued)

*Primary Examiner* — Kabir A Timory

(57) ABSTRACT

A predefined signal has been used to facilitate the detection of the clock rate difference between the transmitter and the receiver. First the predefined signal is to be detected by each of the sensors and its time frame boundary information is acquired by a detector. The detector is composed of a matched filter bank, an event detector and a state sequence detector. The phase error is derived with reference to a fixed reference stored. With each of the sensors updating its local clock to the same fixed reference they can be brought to an arbitrary close clock error with one another. Thus, by applying the method disclosed here the transmitter and all the receivers can have an arbitrary small clock rate error with respect to one another. The method described is really fast in the sense that the delay needed for the detection and adjustment is minimal.

13 Claims, 14 Drawing Sheets

Block diagram for Detection and phase error acquisition

(56) References Cited

U.S. PATENT DOCUMENTS

| | | | |
|---|---|---|---|
| 8,976,907 B2* | 3/2015 | Boritzki | H04L 27/3881 375/340 |
| 9,060,735 B2 | 6/2015 | Yang | |
| 9,218,728 B2 | 12/2015 | Bickel | |
| 9,349,358 B2 | 5/2016 | Castres | |
| 9,354,687 B2 | 5/2016 | Bansal | |
| 9,355,649 B2 | 5/2016 | King | |
| 9,401,996 B2 | 7/2016 | Root | |
| 9,424,853 B2 | 8/2016 | Scharrer | |
| 9,645,272 B2 | 5/2017 | Crowell | |
| 9,685,198 B1 | 6/2017 | Annau | |
| 10,149,088 B2 | 12/2018 | Patil | |
| 10,638,221 B2 | 4/2020 | King | |
| 2006/0122839 A1 | 6/2006 | Li-Chun Wang | |
| 2012/0307871 A1 | 12/2012 | Schaffner | |

OTHER PUBLICATIONS

Shmulik Markovich-Golan, Sharon Gannot and Israel Cohen, "Blind Sampling Rate Offset Estimation and Compensation in Wireless Acoustic Sensor Networks With Application to Beamforming ", International Workshop on Acoustic Echo and Noise Control (IWAENC) 2012 Aachen, Germany.

Stefan Wehr, Igor Kozintsev, Rainer Lienhart, Walter Kellermann, "Synchronization of Acoustic Sensors for Distributed Adhoc Audio Networks and Its Use for Blind Source Separation," In Proc. IEEE 6th Int. Symp. on Multimedia Software Eng., Dec. 2004, pp. 18-25. IEEE Computer Society, NW Washington, DC, United States.

Hiromi Narimatsu, Hiroyuki Kasai, "Duration and Interval Hidden Markov Model for Sequential Data Analysis", ARXIV: 1508.04928V1, arxiv.org, Aug. 20, 2015. Cornell University, Open-Access Archive, Ithaca, New York, USA.

* cited by examiner

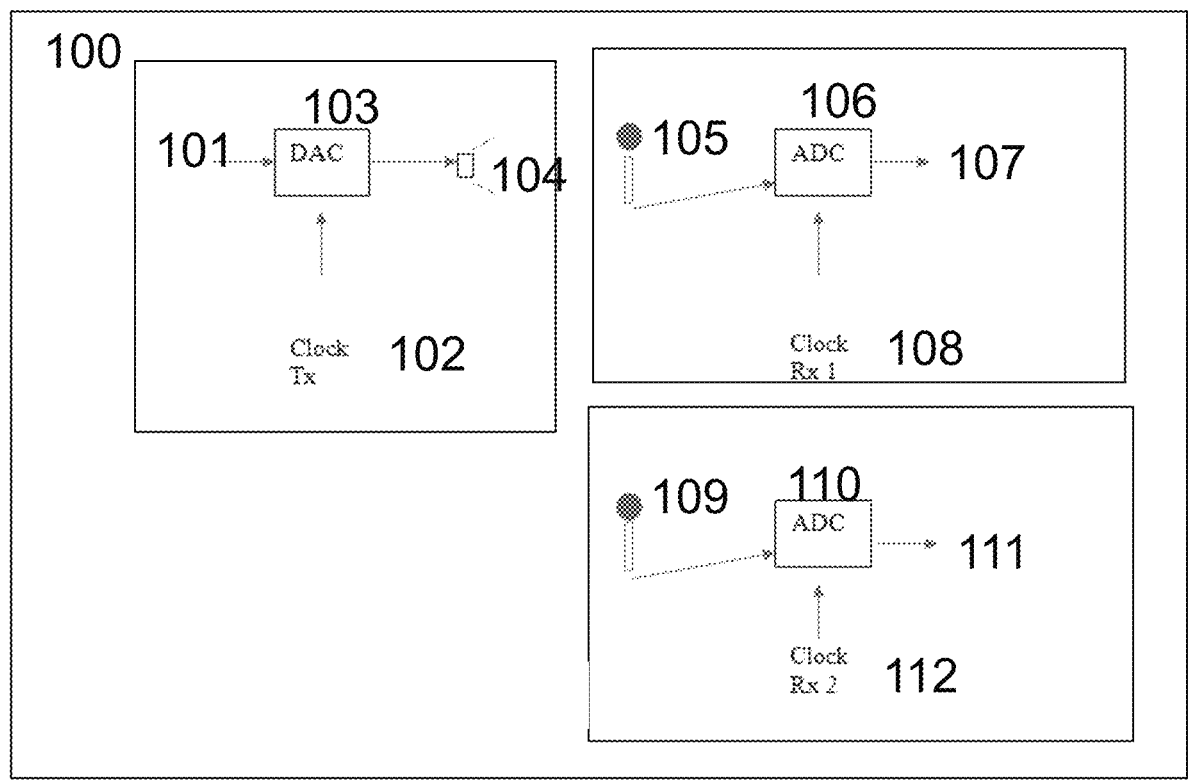
Figure 1, Example of multi-microphone recording scenario

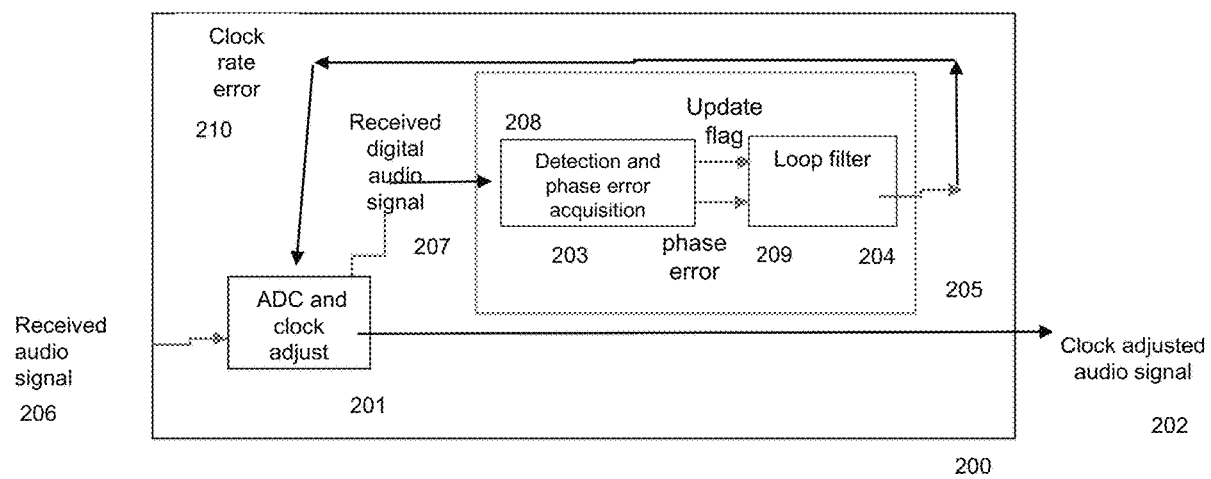
Figure 2, Overall system diagram

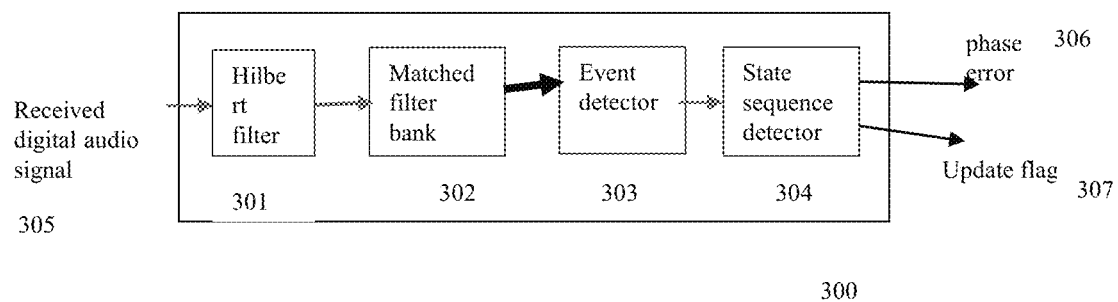
Figure 3, Block diagram for Detection and phase error acquisition

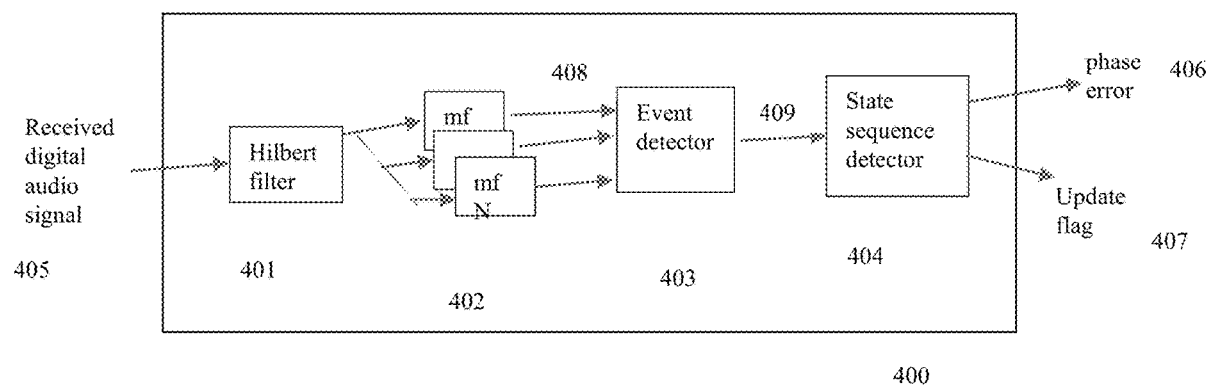
Figure 4, Block diagram for Detection and phase error acquisition (detailed)

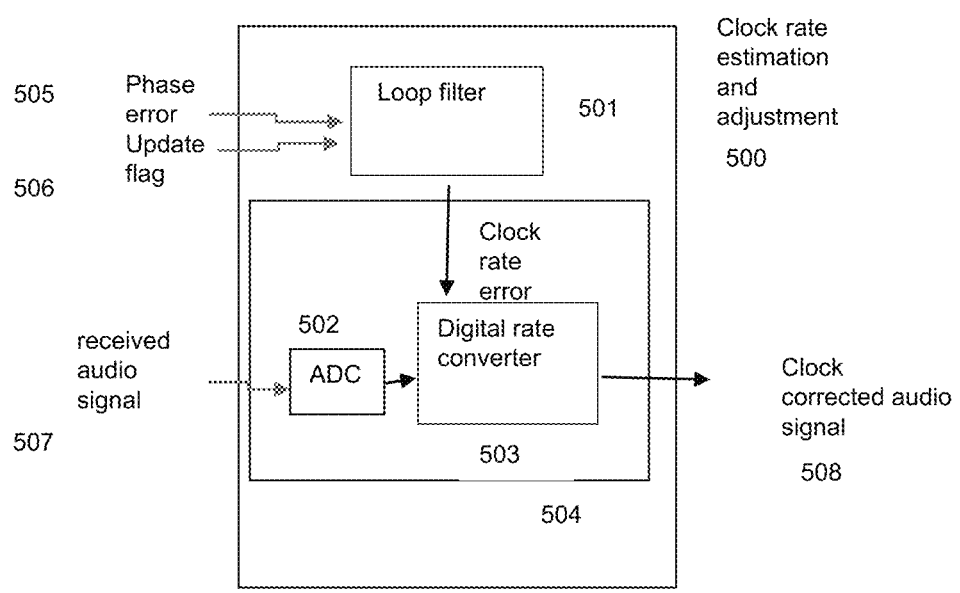
Figure 5, Block diagram for clock rate estimation and adjustment through digital adjustments

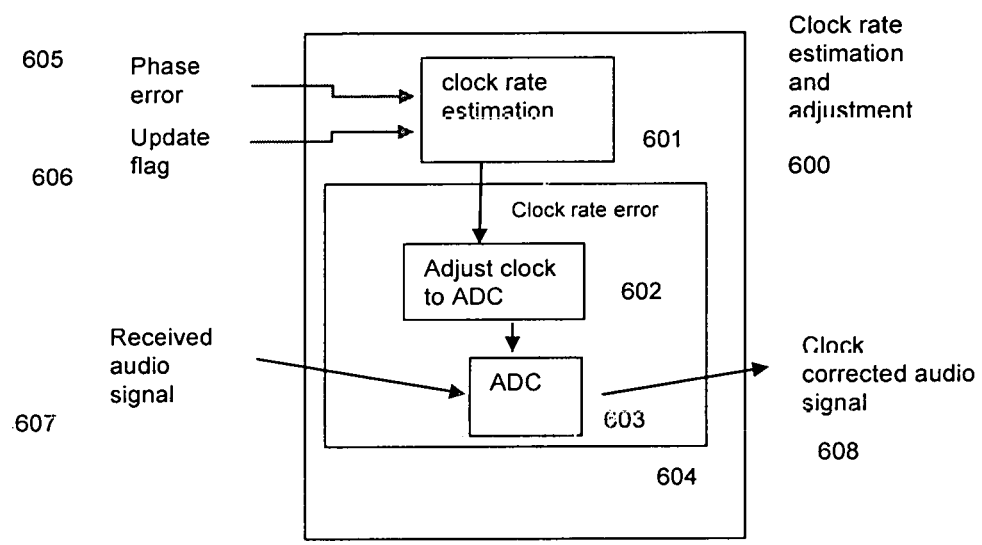
Figure 6, Block diagram for clock rate estimation and adjustment through analog adjustments

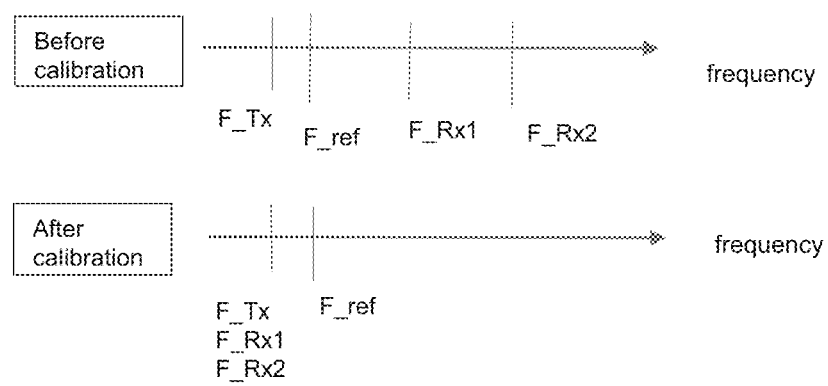
Figure 7, Example of timing error before and after calibration

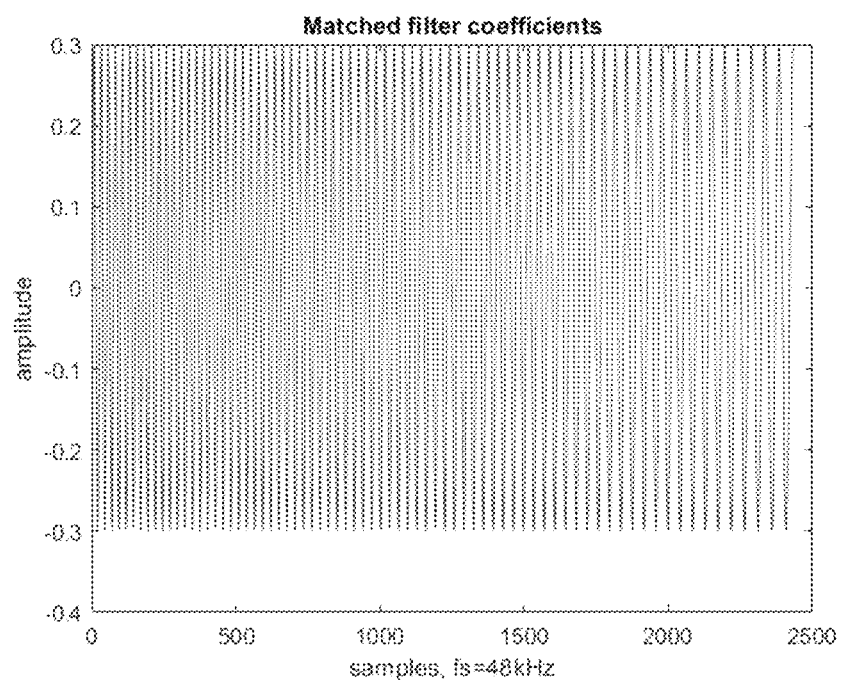
Figure 8, Matched filter coefficients plot

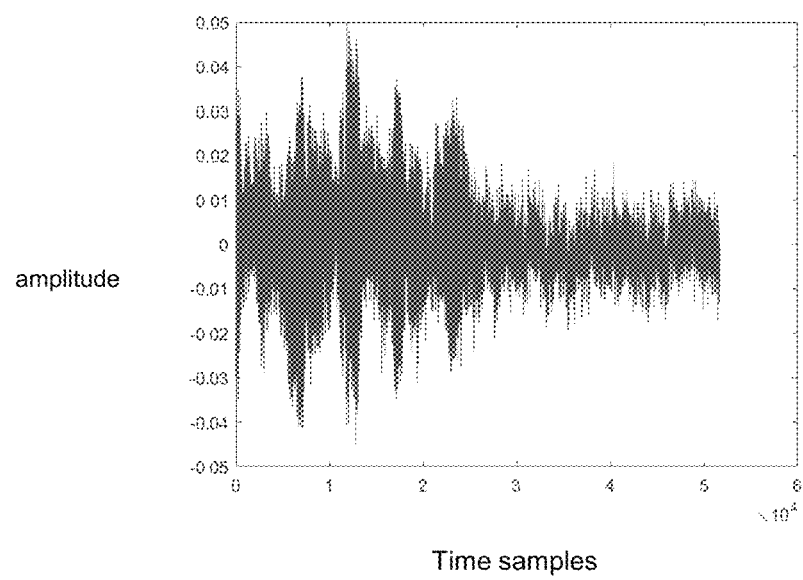
Figure 9, Example of received time-domain signal

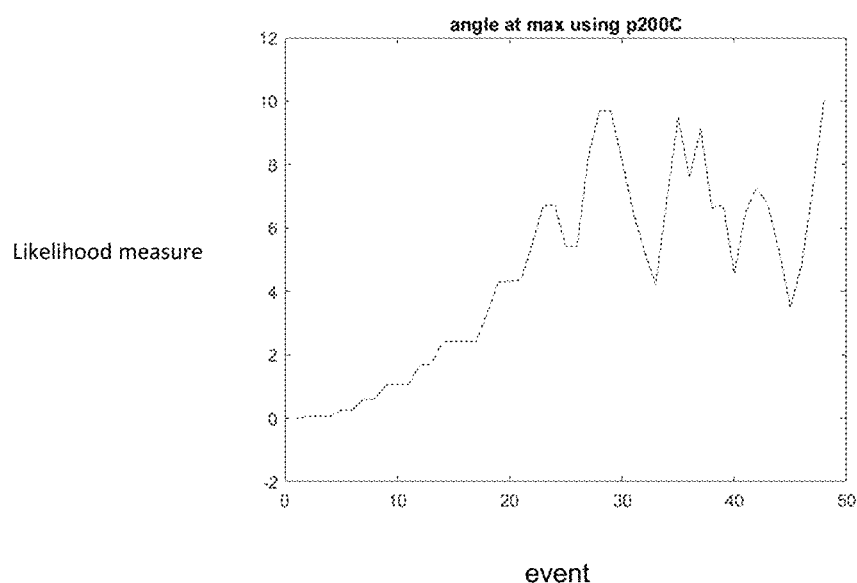
Figure 10, Example of phase error at the output of the matched filters for a +200ppm signal, xlabel is the index to the matched filter

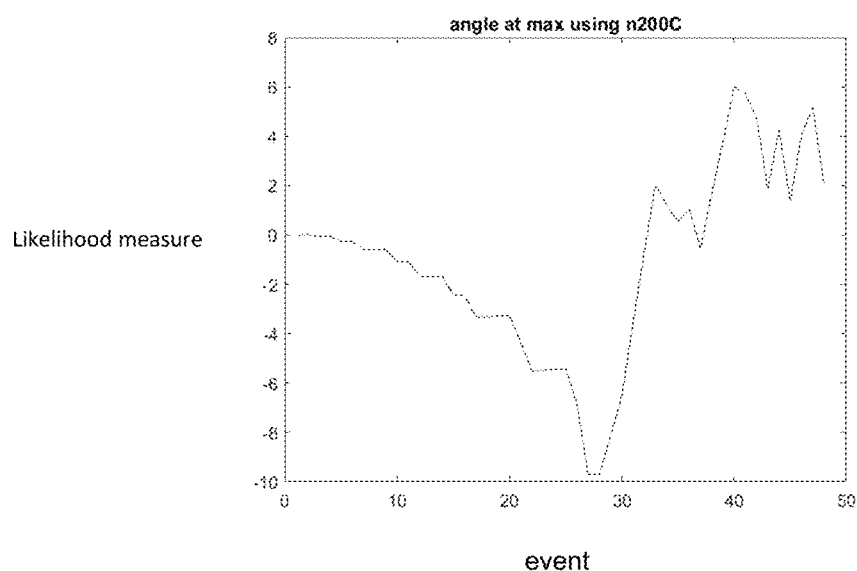
Figure 11, Example of phase error at the output of the matched filters for a -200ppm signal, xlabel is the index to the matched filter

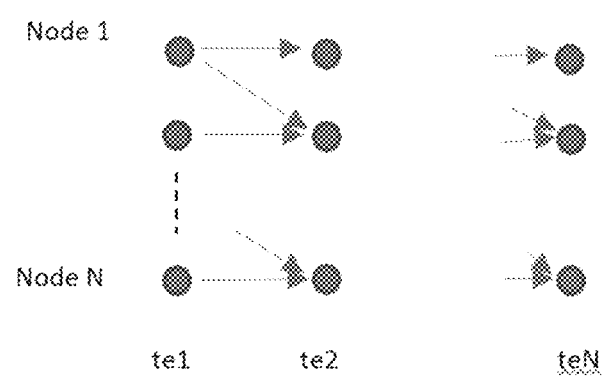
Figure 12, an example of a Trellis diagram

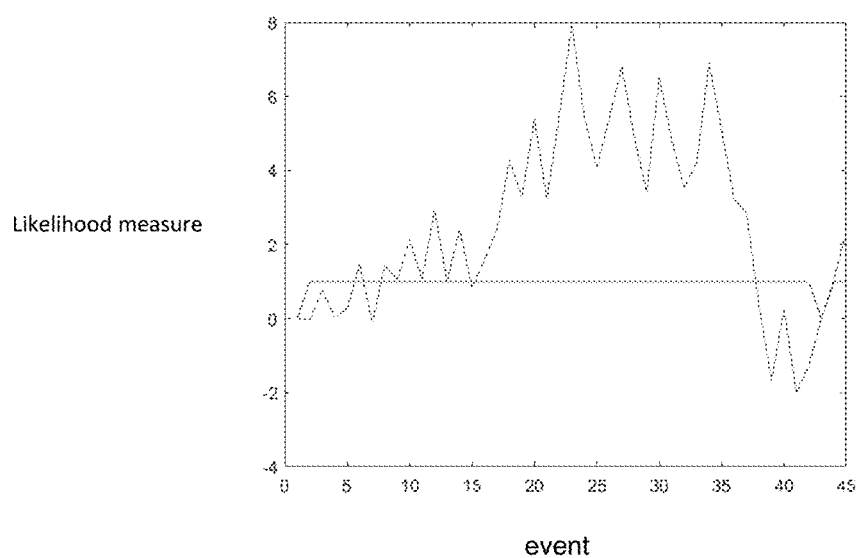
Figure 13, Example of phase error together with the update flag (clock adjustment not ON)

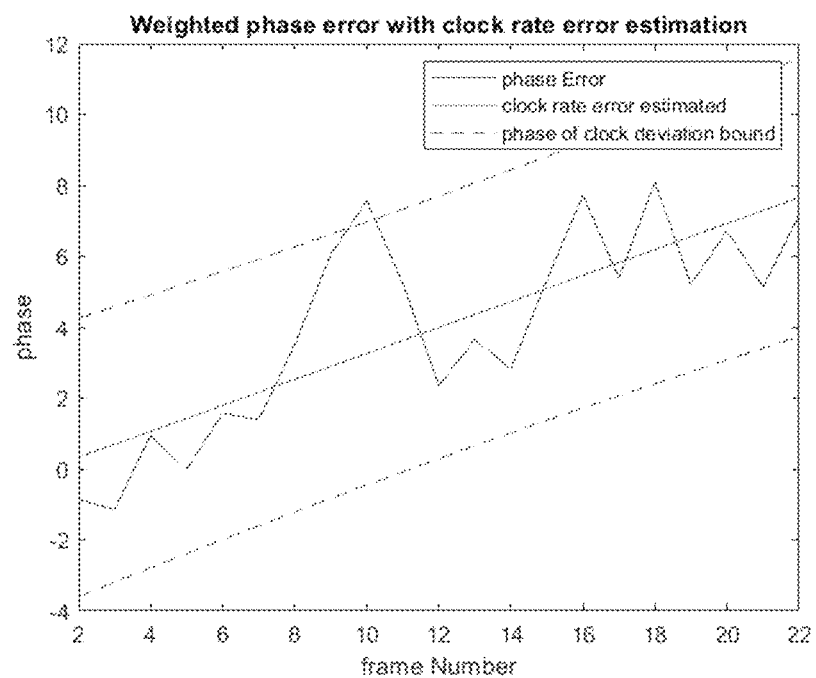
Figure 14 Weighted phase error with clock rate error estimation

METHOD TO ESTIMATE AND COMPENSATE FOR CLOCK RATE DIFFERENCE IN ACOUSTIC SENSORS

BACKGROUND OF THE INVENTION

Field of Invention

There are numerous usage scenarios where it is necessary to capture the sound with multiple channels using multiple microphones. In the development of 3D sound (or binaural sound) with the listener not using headphones. Two microphones are needed to be placed beside the ears to capture the received sound signal. In the development of noise cancellation techniques to lower the noise level inside a car. Multiple microphones are to be placed at numerous passengers sitting locations to capture the sound received. In a music concert the loudspeakers are best to be placed and calibrated to deliver a good presentation of the music throughout the listening arena. When recording the performance of an orchestra numerous microphones are to be placed near different instruments as well as at the target listening positions. In a big conference hall multiple high directivity microphones are hanged from the ceiling to capture the interactions in the audience.

When capturing multiple sound channels simultaneously it is best to have all the microphones outputs be sampled synchronously. That is, all the analog to digital converters be driven by the same clock source. This will ensure that there is no timing phase discrepancy. In the recordings for binaural sound for example, the phase difference between the ears will affect the perceived sound field. Thus, there should be no clock rate difference between the two analog to digital converters. Similarly, the multi-channel recordings for other scenarios are best to be sampled with no clock rate difference.

In order to capture accurately the acoustic response from the environment it is best to have the analog to digital converter at the receiver be sampled by the same clock as the transmitter. In this way all the phase change received is caused by the propagation and not from the clock rate difference between the transmitter and the receiver.

A common practice to record multi-channel sound would be to have all the microphones be connected to back to a box where all the channels are sampled together. It is likely that the transmitter analog to digital converter is also residing in the same box or close to it. In this way the receiver sampling clock could be directly linked to the transmitter clock. This would mean that there are wires connecting to all the microphones. In some scenarios there will be long wires leading through the concert hall.

There are at least two downsides to have all the microphones be connected through wires. One, there are situations where the wires are not feasible to use. Two, the overall system could be expensive.

There are situations where it is not feasible to have wires connected directly between the transmitter and the receiver. In a virtual reality room the user would be walking around and the wires are simply not feasible. Note that this is assuming that the target binaural sound is delivered over the air and not through headphones.

Having wires directly connecting to all the microphones with the transmitter might be expansive. In addition to the cost of wires and location setup there is also a box that terminates all the microphone and to convert all the analog channels to digital. This would be considered a professional audio equipment—an expensive equipment.

There are a lot of ultrasonic applications where the equipment has to be wireless and with no clock rate difference to achieve a good resolution. This includes some radar imaging scenarios.

SUMMARY OF INVENTION

The invention describe here would allow the analog to digital converters be residing beside each of the microphones and yet there is no clock rate difference between the transmitter and the receiver. The analog to digital converter clock remains at the same rate as the transmitter. In addition, no wire is needed to connect between the microphone circuits. All the microphones' sampling would remain at the same clock rate to each other as well as to the transmitter. No wire is needed to connect between the microphone circuits and the transmitter.

Before the recording session begins the receivers need to be calibrated such that all the digital data originated from each of the microphones are running at the same clock rate. The transmitter is a system which consists of a digital to analog converter and a transducer which may be a loudspeaker. During the calibration process the transmitter would play a predefined signal. The microphone would pick up this signal and through an analog to digital converter converts it into a digital data stream. This digital data stream would go through a clock rate estimation process which would measure the rate difference between the received signal and a fixed reference. This clock rate difference can then be compensated in the receiver. By applying the same calibration process to all the analog to digital converters for all the microphone all the receivers would be brought to the same clock rate. The invention describes here details a method to estimate and compensate for clock rate difference between the received signal and the transmitter.

The said calibration process may be done as often as necessary to synchronize the clocks. With frequent calibrations the effect of clock drifts due to temperature change on the circuit boards could be minimized.

The invention disclosed here describes a clock rate estimation process that is composed of the following processing blocks—Hilbert filter, matched filter bank, event detector, state sequence detector, loop filter and a clock phase adjustment mechanism. This clock phase adjustment mechanism can be implemented by analog or digital means. One way is to adjust the clock used in the analog to digital converter. Another way is to apply digital rate conversion on the digital stream.

BRIEF DESCRIPTION OF THE DRAWINGS

FIG. 1, Example of multi-microphone recording scenario

FIG. 2, Overall system diagram

FIG. 3, Block diagram for Detection and phase error acquisition

FIG. 4, Block diagram for Detection and phase error acquisition (detailed)

FIG. 5, Block diagram for clock rate estimation and adjustment through digital adjustments FIG. 6, Block diagram for clock rate estimation and adjustment through analog adjustments FIG. 7, Example of timing error before and after calibration FIG. 8, Matched filter coefficients plot FIG. 9, Example of received time-domain signal FIG. 10, Example of phase error at the output of the matched filters for a +200 ppm signal, xlabel is the index to the matched filter FIG. 11, Example of phase error at the output of the matched filters for a −200 ppm signal, xlabel is the index to the matched filter FIG. 12, an example of a Trellis diagram FIG. 13, Example of phase error together with the update flag (clock adjustment not ON)

FIG. 14 Weighted phase error with clock rate error estimation

DETAILED DESCRIPTION OF EXEMPLARY EMBODIMENTS

FIG. 1 shows an example of a recording scenario where multiple microphones are used. The signal to be transmitted is labeled as 101. The loud speaker (104) is transmitting the signal. There are two receiving microphones (105,109) that will pick up the sound. The transmitter digital to analog (103) converter is using a Tx clock (102) and the two receivers are using two receiving clocks Rx1 (108) and Rx2 (112) respectively. In order to have an accurate recording that can represent with high fidelity the response due to the propagation through the air both the receiving clocks Rx1 and Rx2 need to be running at the same rate. Further, in order to have a high accuracy in the measurement of the propagation channel the transmitter clock (102) is best to be at the same clock rate as the receivers as well.

Note that there is a distinction between the clocks running at the same rate and the clocks being synchronized. Usually when claiming that the clocks are synchronized we meant the clocks are running at the same frequency and with a fixed and known phase offset with respect to one another. In this invention the clocks can be calibrated to be running at the same clock frequencies but the clock phase could still be random with respect to the transmitter clock.

The method disclosed here is to use a fixed reference signal to be used in all microphones. Thus, the receiver Rx1 clock will be matching the rate that was used to sample the prestored reference target signal by the transmitter. The same target reference will be used in the receiver Rx2 and thus have both the receivers to be tracking to the same clock rate. FIG. 7 is a diagram explaining the error that is being minimized.

For example, there are two receiving circuits. Their respective frequencies are denoted as F_ref, F_Tx, F_Rx1 and Rx2 for the reference clock used in the stored samples, transmitter clock, the clock for the first receiver and the clock for the second receiver. In the example, before the calibration process the transmitter is using a clock that is slower than the ideal reference and the two receivers are both running at frequencies higher than the reference clock. After the calibration both the receivers are running at the same rate as the transmitter but they are may not be the same as the ideal reference. Given a set of samples if the transmitter is consuming them faster than the target sampling frequency and the receiver is also sampling at the same faster frequency as the transmitter. Then there would be no error seen but the sound over the air is actually not at the target spectrum—the reference frequency. The method disclosed here would allow the receivers to match the rate as the transmitter.

The overall system diagram for the receiver to adjust its clock rate to match the reference signal is depicted in FIG. 2. In FIG. 2, the received signal (206) is first gone being sampled by the "ADC and clock adjustment" process (201). In this process the clock phase is being adjusted either by analog or digital means. When the system was just started up the clock rate error has not been acquired yet and there would be no adjustment. As the "Detection and phase error acquisition" block (203) begin to process the received digital audio signal (207) a phase error (209) would have been calculated. With the phase error the "loop filter" block (204) would estimate the clock rate error (210). Note that the "loop filter" would update the clock rate error estimation only when the "update" flag (208) from the "detection and phase error acquisition" block (203) is triggered. When the system is not in calibration mode there would be no update necessary. The "ADC and clock adjust" block (201) would then adjust the clock according to the clock rate error (210). The clock adjusted audio signal (202) would then be available as the output. Note that this output can also be fed back (207) to the "detection and phase acquisition" block (205) and to detect the clock rate error (210) again.

The "Detection and phase error acquisition" block (203) consists of the processing blocks, the "Hilbert filter" (301), the "matched filter bank" (302), the "event detector" (303) and the "state sequence detector" (304) process, as shown in FIG. 3 as circuit 300. The Hilbert filter (301) is used to get the analytic signal. It is simply to get a close approximation of the imaginary part of the received signal. The Hilbert filter is the Hilbert transform implemented in form of a filter. The complex representation of the received signal will be passed into the matched filter bank (302). A more detailed view of the system is shown in FIG. 4. The coefficients of the matched filters are derived from the fixed reference signal. Note that from what is described so far the matched filters would have complex coefficients since the Hilbert filter resides before the matched filter. Those who are skill at the art might recognize that the matched filter could be real-valued by having the Hilbert filter be applied after the matched filter. The outputs of the matched filters are passed into the "event detector" (303) which would decide whether there is an event detection. The detected events information would be passed to the state sequence detector (304) which will decide whether there is a proper sequence being detected and that to deduct the phase error (306) to be passed on to the "loop filter" block (204).

A detailed block diagram for the detection and phase error acquisition process is shown in FIG. 4 as circuit (400). During the calibration phase a predefined signal will be transmitted. A record of this predefined signal is available inside all the receivers as matched filter coefficients (402) and will be used as the reference. In this way, all the receivers are measuring the timing error based on the same reference. For example, let this predefined signal be a chirp signal and is defined as follows:

$$x(t) = \sin\left[\phi_0 + 2\pi\left(\frac{c}{2}t^2 + f_0 t\right)\right] \qquad \text{Equation 1}$$

For simplicity in explanation, let us assume that the initial phase used is zero, $\phi_0=0$, The audio signal time be one second long ($T_p$) and that the frequency sweep start from 0 Hz to 20 kHz. So $f_0=0$, c=20 kHz/s.

Let the sampling used be $f_s$. the signal to be send out has a duration of $T_p$
and k=c/2. The received signal is:

$x(n)=\sin(2\pi k(n/f_s)^2)$ $x(n)=\sin(2\pi k n/f_s * n/f_s)$ $x(n)=\sin(w_n * n/f_s)$ \qquad Equation 2

At the output of the Hilbert filter we have:

$$u_a(n)=x(n)+ih(x(n))$$

$$u_a(n)=u_m(n)*e^{i(w_n n/fs+\phi)} \quad \text{Equation 3}$$

The filter response of the matched filter is the time reversed representation of the fixed reference signal. This matched filter can then be broken down into N segments. Each of the segments become a matched filter and together would form our matched filter bank (402). Note that all the matched filters in this example are complex valued and thus the outputs from the filters would be a complex value—that has the phase error (406) information.

For example, the matched filter response for our chirp signal would be, with n being the index to the filter coefficients:

$$mf(n)=e^{i(w_v n/fs+\phi)}, n=[1,nn] \quad \text{Equation 4}$$

where nn=$fs*T_p$ and v=nn−n

For example, we could be using the segment with the frequency content be sweeping from 1 kHz to 2 kHz. In this case and with the sampling frequency be 48 kHz then the filter could have (½0 k*48 k*1 k=2400) samples. An example of the filter response is shown in FIG. 8.

At the receiver the received signal (206) may suffer from bandwidth limitation of the transmitter, bandwidth limitation of the receiver, multipath distortion from the surrounding walls of the room and the noise in the environment. An example of the received waveform is shown in FIG. 9.

By breaking this matched filter into N filters each of their coefficients would be, (for i=1 to N) and the number of taps for each of the filters being (kk=nn/N):

$$mf_i=e^{i(w_v n/fs)}, n=[(i-1)*kk+1,(i-1)*kk+kk] \quad \text{Equation 5}$$

Note that the phase of the matched filter output is the phase error (406) and would be passed to the loop filter (204) if all the conditions are met.

Each of the filters are acting as a correlation between the reference signal and the received signal. In our example it would be correlating ($u_a$) with ($mf_i$). One can see that at the output the phase difference is retained. When the reference signal is passing through these filters, the filter output would peak progressively from filter (i=1 to N).

In addition, the number of input samples to the filter bank in between the peak of filter i to filter (i+1) is a deterministic value by design when there is no noise and distortion. This fact will be used to formulate the calculation of time wise likelihood measure later in equation 17. Plotting the phase at the peak values of the matched filter outputs we can see the trajectory of the phase error (406). An example of is show in FIG. 10 for the case with +200 ppm error and FIG. 11 for the case with −200 ppm error.

Note that when the reference signal has gone through the transmitter, the propagation channel and then the receiver system the received signal (206) might be band-limited, distorted and might be very noisy. In order to have a reliable detection the outputs from the matched filters (408) are to be judged by the event detector to decide whether a reliable detection has been made.

In the event detector since there are N matched filters and so ideally there should be a successive detection in sequence when the reference signal is received. Each detection would constitute to an event and whenever an event is detected the results will be pass to the sequence detector to decipher. The event detector would need to make a decision whether there is an event every sample. The sequence detector would need to be activated only when an event is triggered.

To be more precise, for example an event is called when there is a drop in the max output (408) from all matched filters. This leads to a small look-ahead window needed for the matched filter outputs.

If there are N matched filters. Let the output from all the matched filter be mf, a vector of size N. Then the condition to trigger an event is:

$$\text{trigger\_flag}(ts)=tf(mf(ts+m)) \quad \text{Equation 6}$$

Where trigger_flag(ts) is one when indicating an event and a zero otherwise. The flag would be triggered with m samples delayed. Them samples of look-ahead window is needed to calculate reliable statistics to decide on the triggering flag.

For example, with a simple triggering function that calls an event detected when the peak of the maximum matched filter output drops by one sample—the value of m would be one. In this case the triggering function would be:

$$\{\text{out}(ts),idx(ts)\}=\max_{i=idx}\{mf_i(ts)\} \quad \text{Equation 7}$$

$$\text{triggerflag}(ts)=1, te=ts\{\text{out}(ts+1)<\text{out}(ts) \text{ and}$$
$$\text{out}(ts)>\text{threshold}\}, \text{else triggerflag}(ts)=0 \quad \text{Equation 8}$$

In this example, the trigger flag, the output from equation 7, equation 8 and the phase and magnitude from all the matched filters (409) are to be passed into the state sequence detector block. The output from equation 7 is basically the magnitude and the time sample index of the matched filter output which has the largest magnitude of all the matched filters. The output from equation 8 is to decide whether it is an event by checking the largest magnitude against a threshold.

When the event is triggered then the "state sequence detector" would calculate the likelihood of detecting the target sequence. The time between the triggering events can be used to weight the probability of occurrence—$\sigma_i$. This value is shown in equation 17.

Here is a detailed description of the "state sequence detector" block. Given the sequence of observation O and model λ, the probability of having this observation fitting into our model is P(O|λ).

$$P(O|Q,\lambda) = \prod_{t=1}^{T} P(O_t|q_t,\lambda) \quad \text{Equation 9}$$

$$=b_{q1}(O_1)b_{q2}(O_2)\ldots b_{qT}(O_T) \quad \text{Equation 10}$$

Where $b_{q3}$ is the probability of the observation for time t over the states.

Probability of the state sequence is:

$$P(Q|\lambda)=\pi_{q1}a_{q1q2}a_{q2q3}\ldots q_{qT-1qT} \quad \text{Equation 11}$$

Probability of O for all possible Q is:

$$P(O|\lambda) = \sum_{\forall Q} P(O|Q,\lambda)P(Q|\lambda) \quad \text{Equation 12}$$

Since at any state at t+1 can only be reached from N previous states at time t the operations can be broken down into iterative steps with the likelihood of each state at time t being:

$$\alpha_t(i)=P(O_1 O_2 \ldots O_t, q_t=S_i|\lambda) \quad \text{Equation 13}$$

i.e. the probability of the partial observation sequence $O_1$ $O_2 \ldots O_t$ and state $S_i$ at time t given the model $\lambda$. We can solve for $\lambda_t(i)$ inductively as follows:

1, initialization:

$$\lambda_1(i)=\lambda_i b_i(O_1) 1 \leq i \leq N \qquad \text{Equation 14}$$

2, Induction:

$$\alpha_{t+1}(i) = \left[\sum_{j=1}^{N} \alpha_j(j)c_{ij}\right]b_i(O_{t+1}) \qquad \text{Equation 15}$$

$$1 \leq t \leq T-1$$
$$1 \leq j \leq N$$

3, Termination:

$$P(O \mid \lambda) = \sum_{i=1}^{N} \alpha_T(i) \qquad \text{Equation 16}$$

In our example, when calculating the likelihood of the observation be in a particular state:

$$ss = \sum_{i}^{N} mf_i \qquad \text{Equation 17}$$

$$\sigma_i = G(te_{i+1} - te_i)$$

$$b_i(O) = \frac{mf_i}{ss} * \sigma_i$$

Note that the function G(.) is a probability distribution that serves to provide a weighting value to the probability of being in a particular node. Since this weighting is derived from the detection time this would make the weight a time wise likelihood measure. The said probability distribution could be the gaussian distribution with the mean being the triggering time for the noise free chirp signal. The standard deviation for the gaussian distribution could be related to the noise variance of the received signal.

An example trellis diagram for the detection of the chirp signal is in FIG. 12.

The N nodes denote the N matched filters used. At each event time the trellis would progresses forward. The state transition probability ($c_{ij}$) could be deducted from measurements from the target usage environment.
A detection could be flagged when the condition has been met. The said condition could be that the accumulated probability ($a_i$) is larger than a threshold and that it has continuously crossed the threshold ($\gamma$) for a predefined number of times.

$$\text{detection}=1, a_i>\gamma \text{ at } t_i \text{ for } m \text{ consecutive } i \qquad \text{Equation 18}$$

When a sequence is detected then the "update flag" (407) would be ON which allows the loop filter to update the rate error estimate based on the phase error. The phase error (406) is the phase at the output of the matched filter that had triggered the event detector, equation (Equation 5). An example of the phase error from the triggered from each of the matched filters together with the update flag is shown in FIG. 13. Note that the plot shows the case where there is no clock adjustments or interpolations. Thus, in the figure the error keeps increasing when the intended signal is present.

Examples of a loop filter (204) could be a low pass filter, lead-lag filter or a proportional-integral-derivative filter as used in control systems.

FIG. 5 and FIG. 6 shows the overall methods in adjusting the clocks. In FIG. 5 it was adjusted by digital means while in FIG. 6 it was done through adjusting the oscillator in the ADC sampling.

With the phase error acquired at the matched filters then passed onto the loop filter and then followed by a timing adjustment block to correct it. This is essentially a phase-locked loop (PLL). The PLL is a popular structure in the communication systems but are rarely used in audio signals and audio systems.

In addition, the "loop filter" block could be a procedure to estimate the projectile of the phase to arrive at a proper clock error adjustment. For example, our target clock error trajectory ($p_e$) is a linear curve:

$$p_e = mi + c \qquad \text{Equation 19}$$

Where "m" is the slope that indicates the error rate of the clock and is our target to be calculated. And this is to be estimated by a set of points $\{i, g_i\}$. Where "I" is the frame number and $$g_i = w_i^* \phi_i$$

and $w_i$ is the weight per frame "1" and $\phi_i$ is the phase error per frame "I". This is a polynomial curve fitting procedure.

An example of the estimated clock error is shown in FIG. 14. Note that those skill at the art might place bounding conditions on the estimation. For example, throw away samples when it is outside the predefined bounds. Another example would be to use a higher order polynomial as the target curve fitting model.

With the clock rate error (210) estimated it can be applied to adjust the clock to alleviate the error. For example, a slope of 4 degree in 10 frames would require adjustment equivalent to −100 ppm error. The clock would then need to be speed up by 100 ppm.

FIG. 5 and FIG. 6 shows the overall methods in adjusting the clocks. The ADC-and-clock-adjustment block is shown as block 201, 504 and 604. In FIG. 5 (504), it was adjusted by adjusting the sampling rate by resampling or interpolation techniques. In FIG. 6 (604), it was done through adjusting the oscillator in the ADC sampling.

What is claimed is:

1. A method of estimating and compensating a clock rate difference between a speaker and a microphone circuit comprising the steps of:
    transmitting a predefined signal by converting the predefined signal into an analog signal through a digital-to-analog converter (DAC) followed by a speaker;
    sampling times of the DAC is governed by a transmit clock source;
    a microphone picks up a sound generated from the speaker;
    an output of the microphone be converted to digital received signal by an analog-to-digital converter (ADC) which uses a receive clock source;
    an output of the ADC is the digital received signal and is used as the an input to one or more matched filters to generate phase and magnitude outputs;
    the matched filters each has a unique identifying index;
    the matched filters phase and magnitude outputs are used in an event detector;
    the event detector outputs an index of the matched filter that was triggered to a state sequence detector;

the state sequence detector detects whether an expected sequence of matched filter indexes have been received and generate a sequence likelihood value;

the state sequence detector uses a time taken to receive a trigger to calculate a time likelihood value;

the state sequence detector uses the time likelihood value and the sequence likelihood value to calculate an overall likelihood value;

the state sequence detector outputs an update flag when the overall likelihood value is higher than a predefined threshold;

the update flag triggers a use of the phase of the matched filter output as an input to a loop-filter; and the loop-filter output is a rate error estimate of the clock rate difference.

2. The method of claim 1, wherein said matched filters may comprise of segments of the predefined signals.

3. The method of claim 1, wherein a phase output from a matched filter is from a matched filter with complex valued coefficients.

4. The method of claim 1, wherein a phase output the matched filters is from a matched filter with real valued coefficients followed by a Hilbert filter to convert into complex valued output.

5. The method of claim 1, wherein the event detector implements a detection function that triggers an output whenever an input signal magnitude is higher than a threshold.

6. The method of claim 1, wherein the output of the event detector comprises the index of the matched filter that was triggered.

7. The method of claim 1, wherein the output of the event detector comprises a time it takes to trigger a time since the last time was triggered.

8. The method of claim 1, wherein the state sequence detector detects whether an expected sequence of matched filter indexes have been triggered and generate a sequence likelihood value with a higher value being a sequence received that is closer to the expected sequence.

9. The method of claim 1, wherein the state sequence detector uses a time taken to receive a new event to calculate a time likelihood value with a higher value being an event triggered time is closer to an expected triggering time.

10. The method of claim 1, wherein the state sequence detector output an update flag when an overall likelihood value is higher than a predefined threshold.

11. The method of claim 1, where the loop-filter uses the phase of the matched filters output together with its corresponding filter index over multiple events to obtain an estimation of a phase advancement which is output as a rate error estimate.

12. The method of claim 1, where a sign of the loop-filter output is used to increase or decrease the sampling clock of the ADC.

13. The method of claim 1, where the adjustment to the sampling rate be an adjustment through interpolation of the received signal.

* * * * *